United States Patent
Kim et al.

(10) Patent No.: US 11,936,116 B2
(45) Date of Patent: Mar. 19, 2024

(54) DUAL POLARIZED OMNI-DIRECTIONAL ANTENNA AND BASE STATION INCLUDING SAME

(71) Applicant: KMW INC., Hwaseong-si (KR)

(72) Inventors: Duk Yong Kim, Yongin-si (KR); Young Chan Moon, Hwaseong-si (KR); In Ho Kim, Yongin-si (KR); Oh Seog Choi, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 94 days.

(21) Appl. No.: 17/464,739

(22) Filed: Sep. 2, 2021

(65) Prior Publication Data
US 2022/0059951 A1    Feb. 24, 2022

Related U.S. Application Data

(63) Continuation of application No. 16/550,471, filed on Aug. 26, 2019, now Pat. No. 11,114,772, which is a
(Continued)

(30) Foreign Application Priority Data

Feb. 28, 2017    (KR) .................. 10-2017-0026078

(51) Int. Cl.
  *H01Q 21/26*    (2006.01)
  *H01Q 9/16*    (2006.01)
  *H01Q 25/00*    (2006.01)
(52) U.S. Cl.
  CPC ............ *H01Q 25/005* (2013.01); *H01Q 9/16* (2013.01); *H01Q 21/26* (2013.01); *H01Q 25/00* (2013.01); *H01Q 25/001* (2013.01)
(58) Field of Classification Search
  CPC ...... H01Q 21/26; H01Q 25/001; H01Q 25/00; H01Q 9/16
(Continued)

(56) References Cited

U.S. PATENT DOCUMENTS 3,740,754 A * 6/1973 Epis ............... H01Q 13/18
                                                     343/822
4,922,259 A    5/1990  Hall et al.
(Continued)

FOREIGN PATENT DOCUMENTS

| JP | 2009-005167 A | 1/2009 |
| KR | 10-0291156 B1 | 7/2001 |
| KR | 10-1053442 B1 | 8/2011 |

OTHER PUBLICATIONS

International Search Report for PCT/KR2018/002426, dated May 24, 2018, and its English translation.
(Continued)

*Primary Examiner* — Hai V Tran
(74) *Attorney, Agent, or Firm* — Insight Law Group, PLLC; Seung Lee

(57) ABSTRACT

The present disclosure includes, in a dual polarized omni-directional antenna and a base station including the same, a plurality of radiating elements disposed to be spaced apart in one direction by the dual polarized omni-directional antenna, and a feed line for providing a feed signal to the plurality of radiating elements, and the plurality of radiating elements include a first radiator for generating one polarization of dual polarization, and a second radiator for generating the other polarization of the dual polarization, respectively, the first radiator is prepared on a first surface, and the second radiator is prepared on a second surface, and a main lobe direction of the first radiator and a main lobe direction of the second radiator are different directions from each other.

19 Claims, 18 Drawing Sheets

Related U.S. Application Data continuation of application No. PCT/KR2018/002426, filed on Feb. 28, 2018.

(58) Field of Classification Search
USPC .......................................................... 343/797
See application file for complete search history.

(56) References Cited

U.S. PATENT DOCUMENTS

| | | |
|---|---|---|
| 5,173,715 A | 12/1992 | Rodal et al. |
| 5,592,182 A | 1/1997 | Yao et al. |
| 5,828,348 A | 10/1998 | Tassoudji et al. |
| 6,094,178 A | 7/2000 | Sanford |
| 2008/0291105 A1* | 11/2008 | Schadler ................ H01Q 21/08 |
| | | 343/793 |
| 2017/0170550 A1 | 6/2017 | Moon et al. |
| 2017/0244159 A1 | 8/2017 | Moon et al. |

OTHER PUBLICATIONS

Non-final office action dated Dec. 22, 2020 for U.S. Appl. No. 16/550,471.
Notice of Allowance dated May 12, 2021 for U.S. Appl. No. 16/550,471.

* cited by examiner

DUAL POLARIZED OMNI-DIRECTIONAL ANTENNA AND BASE STATION INCLUDING SAME

CROSS-REFERENCE TO RELATED APPLICATION(S)

This application is a Continuation of U.S. application Ser. No. 16/550,471, filed Aug. 26, 2019, which is a Continuation of International Application No. PCT/KR2018/002426, filed on Feb. 28, 2018, which claims the benefit of and priority to Korean Patent Application No. 10-2017-0026078, filed on Feb. 28, 2017, the content of which are herein incorporated by reference in their entirety.

TECHNICAL FIELD

The present disclosure relates to an antenna suitable for being applied to a base station or a relay station, etc. in a mobile communication (PCS, Cellular, CDMA, GSM, LTE, etc.) network, and a base station including the same, and more particularly, to a dual polarized omni-directional antenna for mobile communication service and a base station including the same.

BACKGROUND ART

An omni-directional antenna is also called a non-directional antenna, and is an antenna configured so that an electromagnetic wave is evenly and horizontally radiated in the entire direction of 360 degrees. In a mobile communication network, since a mobile communication terminal may not predict which direction to move due to its characteristics, an omni-directional antenna adopting a circular mono-pole antenna structure is generally provided. An antenna installed in a base station or a relay station in the mobile communication network is usually installed with a directional antenna for directing each service range divided into three sectors.

In recent years, as a Long Term Evolution (LTE) service is in full swing, a small cell or micro cell equipment is constructed in order to provide smooth service of a shadow region such as inside a building, and also to increase a data transmission speed. The small cell may be serviced with the coverage of about 300 m or less, and since the size of the equipment itself also requires a small size, an omni-directional antenna is mainly used for the corresponding equipment.

The omni-directional antenna generally used mainly use single polarization (V-pol). However, a Multi Input Multi Output (MIMO) technology is inevitable for LTE service, and for this purpose, a dual polarized antenna is required. In a conventional omni-directional antenna, dual polarization is generally referred to as horizontal polarization (H-pol; 0 degrees) and vertical polarization (V-pol; 90 degrees).

However, since the dual polarization (+/−45 degrees) has the lowest correlation between the two polarizations in the reflection or diffraction of the radio wave by fading, a directional antenna generally applied to a base station or a relay station mainly uses a dual polarization (+/−45 degrees). Accordingly, a research is being conducted to generate+/−45 degrees dual polarization even in the omni-directional antenna.

FIG. 1A is an exemplary perspective diagram of an omni-directional antenna for generating a conventional+/− 45 degrees dual polarization, and FIG. 1B is a plane diagram thereof. The omni-directional antenna shown in FIGS. 1A and 1B corresponds to a form in which three base station antennas for three sectors of a conventional structure have been combined into one. That is, it is installed in a form in which the upstanding first, second, and third reflecting plates 11, 12, 13 have been coupled to each other back to back, and each of the first to third reflecting plates 11, 12, 13 is installed with at least one of radiating elements 21, 22, 23. Each of the radiating elements 21, 22, 23 may be implemented in a dipole type generating general+/−45 degrees dual polarization.

The omni-directional antenna shown in FIGS. 1A and 1B substantially correspond to a structure in which three base station antennas are symmetrically coupled to each other in parallel, and has a drawback in that their diameter and overall size are considerably large. In order to partially compensate for this drawback, as shown in FIG. 2, a structure in which three base station antennas have been implemented to be stacked in a vertical direction has been proposed. That is, as shown in FIG. 2, each of the upstanding first, second, and third reflecting plates 11, 12, 13 is implemented in a form coupled to be stacked along one vertical axis, and each of the first to third reflecting plates 11, 12, 13 is configured in a state having mutually rotated 120 degrees with respect to the vertical axis.

The structure of the omni-directional antenna shown in FIG. 2 has a smaller diameter than the structure of the omni-directional antenna shown in FIGS. 1A and 1B, but has a drawback in which its length is vertically lengthened. Further, although the omni-directional antenna shown in FIG. 2 has a relatively small diameter, nevertheless, it has been still difficult to apply to a small cell, such as inside a building, substantially, in terms of its diameter and size.

DISCLOSURE

Technical Problem

An object of the present disclosure is to provide an omni-directional antenna for mobile communication service and a base station including the same, which may implement the entire size of the antenna to be smaller and lighter, have good omni-direction radiating characteristics, and generate dual polarization (+/−45 degrees).

Technical Solution

According to one feature of the present disclosure for achieving the object, a dual polarized omni-directional antenna of the present disclosure includes a plurality of radiating elements disposed to be spaced apart in one direction, and a feed line for providing a feed signal to the plurality of radiating elements, and the plurality of radiating elements include a first radiator for generating one polarization of dual polarization, and a second radiator for generating the other polarization of the dual polarization, respectively, the first radiator is prepared on a first surface, and the second radiator is prepared on a second surface, and a main lobe direction of the first radiator and a main lobe direction of the second radiator are different directions from each other.

Further, the first radiator and the second radiator may be a dipole type, and the first surface and the second surface may be planes facing each other.

Further, the first radiator and the second radiator may intersect each other in an X shape.

Further, each of the first radiator and the second radiator may have a predetermined angle with the one direction, may be prepared in the form of extending along each of the first surface and the second surface, and have a curvature changed in the extending direction.

Further, the first surface and the second surface may be connected to each other, and the first radiator and the second radiator may be positioned to face each other.

Further, the plurality of radiating elements may be implemented by a circuit pattern using a Flexible-PCB (F-PCB), respectively.

Further, the dual polarized omni-directional antenna may further include a feed plate on which a feed pattern has been formed so as to feed the first radiator and the second radiator, respectively, and both side surfaces of the feed plate may be attached and fixed to the Flexible-PCB molded in a cylinder shape.

Further, the feed plate may include a support layer having the feed pattern formed on the upper surface thereof, and a ground layer formed on the lower surface of the support layer, and on which a ground pattern has been formed, and an inner conductor of the feed line may penetrate the feed plate to be electrically connected with the feed pattern, and an outer conductor of the feed line may be electrically connected with the ground pattern.

Further, the dual polarized omni-directional antenna may further include a first half radiating element having the first radiator for generating the one polarization of the dual polarization, and a second half radiating element having the second radiator for generating the other polarization of the dual polarization.

Further, the first half radiating element and the second half radiating element may be positioned at both end portion sides of the one direction of the plurality of radiating elements, respectively, and each of the plurality of radiating elements and the first half radiating element may be spaced apart at the same angle while being spaced apart in the one direction.

According to another feature of the present disclosure for achieving the object, a dual polarized omni-directional antenna of the present disclosure includes a plurality of radiating elements disposed to be spaced apart in one direction, and the plurality of radiating elements may include a first radiator for generating one polarization of dual polarization, and a second radiator for generating the other polarization of the dual polarization, respectively, and each of the first radiator and the second radiator may have a predetermined angle with the one direction and may be prepared in the form of extending along each of a first curved surface and a second curved surface.

Advantageous Effects

As described above, the dual polarized omni-directional antenna and the base station including the same according to the present disclosure may generate the +/−45 degrees dual polarization while having the good omni-direction radiating characteristics, and reduce the length in the vertical direction while reducing the diameter of the antenna compared to the conventional omni-directional antenna.

In particular, when implementing the small-sized cell MIMO antenna, it is possible to significantly reduce the diameter of the radiating element compared to the conventional one even while satisfying the predetermined isolation reference, thereby enabling the optimum design of the X-pol omni-directional antenna that may be used for the small-sized cell MIMO antenna.

BEST MODE

Hereinafter, preferred embodiments according to the present disclosure will be described in detail with reference to the accompanying drawings. In the following description, specific details such as specific components are shown, and it will be apparent to those skilled in the art that it is only provided to help a more general understanding of the present disclosure and predetermined modifications or changes for these specific details may be made within the scope of the present disclosure.

Figure 3A:
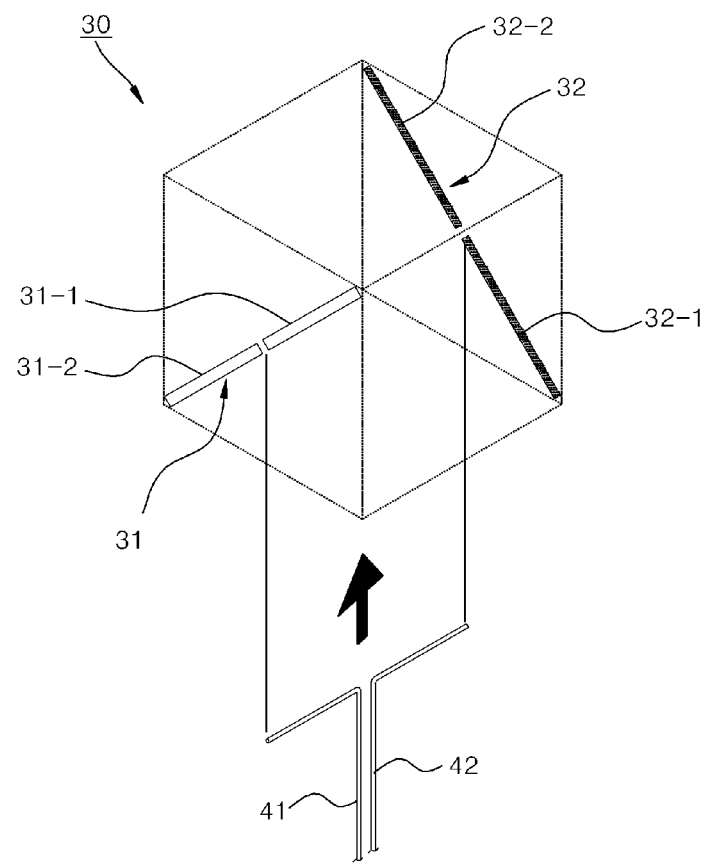
FIGS. 3A, 3B, and 3C are diagrams showing first exemplary structures of a radiating element that may be applied to an omni-directional antenna for generating dual polarization according to various embodiments of the present disclosure.
Figure 3B:
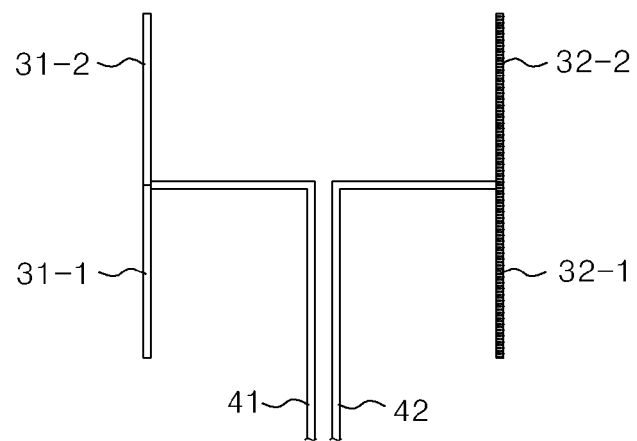
Figure 3C:
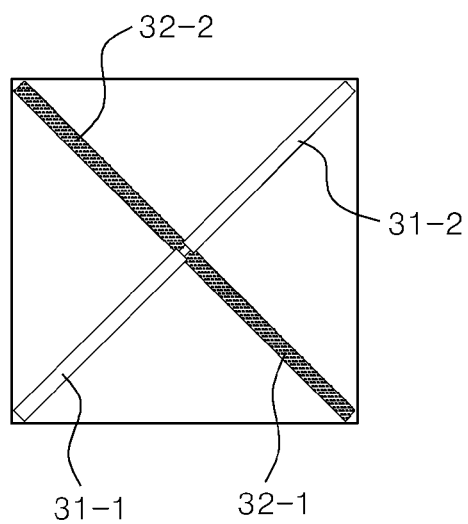

FIGS. 3A, 3B, and 3C are diagrams showing schematic first exemplary structures of a radiating element that may be applied to an omni-directional antenna for generating dual polarization according to various embodiments of the present disclosure, and FIG. 3A is a partial exploded perspective diagram, FIG. 3B is a side diagram of one side thereof, and FIG. 3C is a side diagram of the other side thereof.

A plurality of radiating elements 30 that may be applied to various embodiments of the present disclosure are disposed to be spaced apart in one direction, particularly, in a vertical direction, and include a first radiator 31 for generating one polarization of dual polarization, and a second radiator 32 for generating the other polarization of the dual polarization, and the first radiator 31 is prepared on a first surface and the second radiator 32 is prepared on a second surface.

Referring to FIGS. 3A to 3C, the radiating element 30 according to an embodiment of the present disclosure is implemented as a structure of coupling the dipole type first radiator 31 for generating +45 degrees polarization, for example, of the dual polarization, and the dipole type second radiator 32 for generating −45 degrees polarization of the dual polarization. In FIGS. 3A and 3B (further, in the following accompanying drawings), although the second radiator 32 is shown in a darker color than the first radiator 31, it will be understood that it is only to facilitate discrimination between the two radiators 31, 32, and the two radiators 31, 32 have substantially the same structure.

The first radiator 31 formed of a dipole type has a first radiating arm 31-1 and a second radiating arm 31-2 as a main configuration, and likewise, the second radiator 32 formed of a dipole type also has a first radiating arm 32-1 and a second radiating arm 32-2 as a main component. The first radiator 31 is configured to receive a first transmission signal generated by the +45 degrees polarization through a first feed line 41, and the second radiator 32 is configured to receive a second transmission signal generated by −45 degrees polarization through a second feed line 42. The first feed line 41 and the second feed line 42 may also be configured by using a general coaxial line, and configured by using various line structures such as a strip line or a micro-strip line.

Figure 1A:
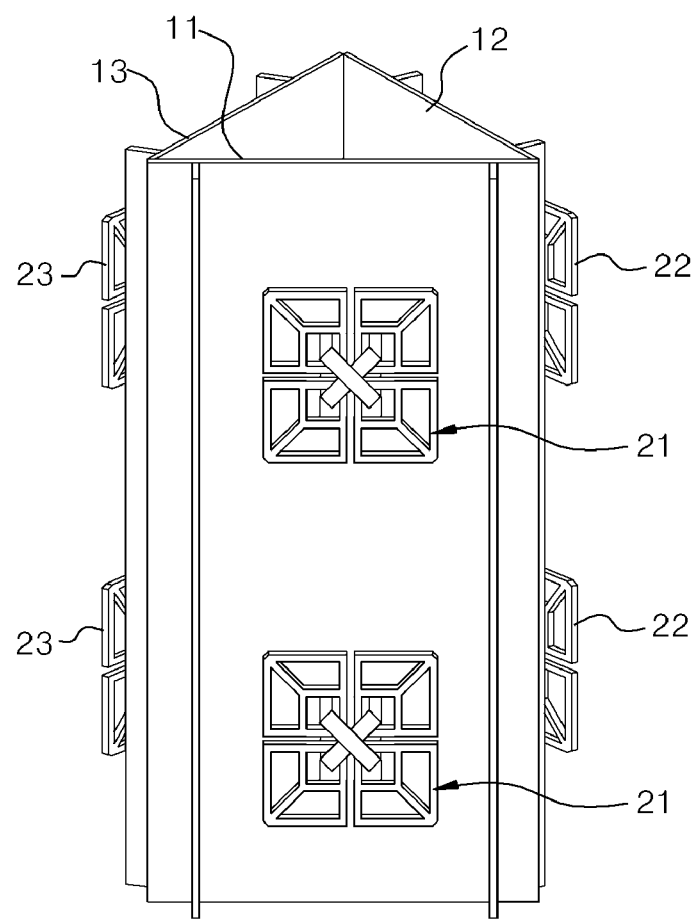
FIGS. 1A and 1B are diagrams showing an exemplary structure of an omni-directional antenna for generating a conventional dual polarization.
Figure 1B:
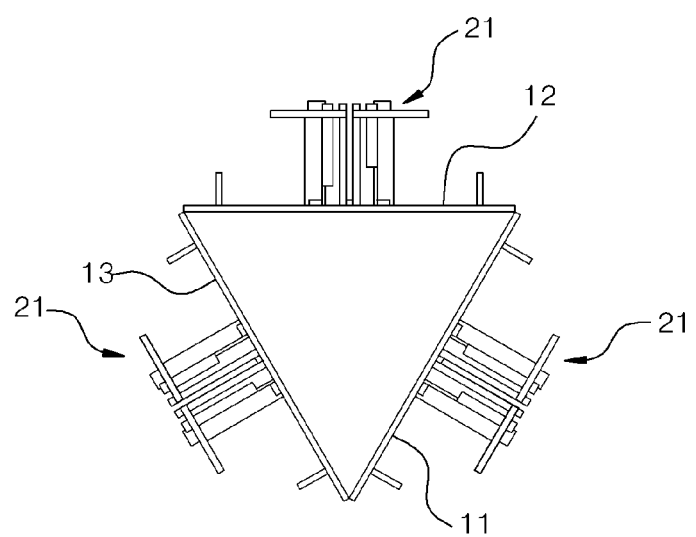
Figure 2:
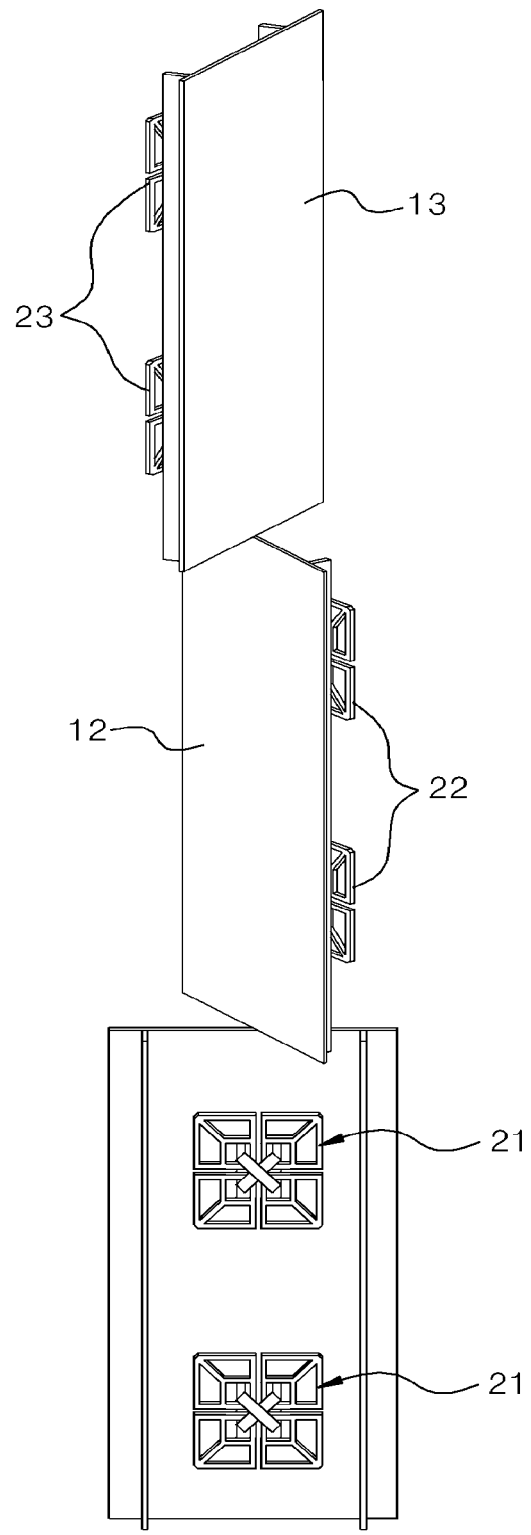
FIG. 2 is a diagram showing another exemplary structure of an omni-directional antenna for generating the conventional dual polarization.

Here, the radiating element 30 for generating the dual polarization of +/−45 degrees through the combined structure of the first and second radiators 31 and 32 has a structure different from a general structure. That is, in the conventional radiating element for generating +/−45 degrees dual polarization, for example, as shown in FIGS. 1A to 2, the radiator for generating +45 degrees polarization and the radiator for generating −45 degrees polarization are configured on substantially the same plane so that the directions of main lobes of the two radiators are formed in the same direction. In contrast, in the radiating element 30 applied to the embodiments of the present disclosure, the first radiator 31 and the second radiator 32 are configured to be formed on a first surface and a second surface, which are planes spaced apart from each other to face each other, that is, planes facing each other, respectively. Further, a beam forming direction of the first radiator 31 and a beam forming direction of the second radiator 32 become directions opposite to each other. That is, the main lobe of the first radiator 31 and the main lobe of the second radiator 32 are formed in directions different from each other, particularly, in opposite directions (directions having a difference of 180 degrees).

It may be seen that the first radiator 31 and the second radiator 32 are formed, respectively, on planes corresponding to the surfaces facing each other among the hexahedral box-shaped surfaces as indicated by the dotted lines in FIGS. 3A to 3C, respectively. Further, as shown more clearly in FIG. 3C, for example, when viewed from a plane where the first radiator is formed, the first and second radiators 31, 32 are designed in a structure that intersects each other in an X shape.

The radiating patterns of each of the first and second radiators 31, 32 may also be configured by molding a thin metal plate (e.g., copper plate). Further, they may also be implemented by a circuit pattern through a pattern printing method by using a general flat Printed Circuit Board (PCB) or a Flexible-PCB (F-PCB), for example.

Figure 4A:
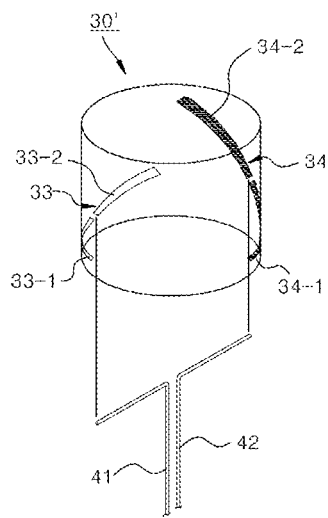
FIGS. 4A and 4B are diagrams showing second exemplary structures of a radiating element that may be applied to an omni-directional antenna for generating dual polarization according to various embodiments of the present disclosure.
Figure 4B:
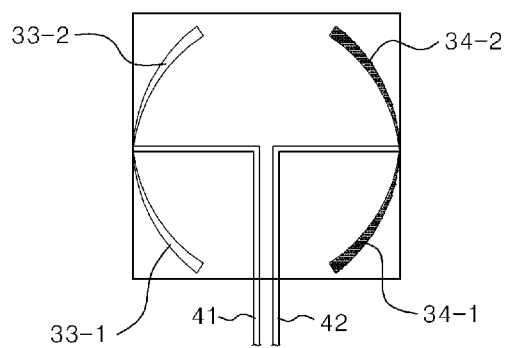

FIGS. 4A and 4B are diagrams showing second exemplary structures of a radiating element that may be applied to an omni-directional antenna for generating dual polarization according to various embodiments of the present disclosure, and FIG. 4A is a partial exploded perspective diagram and FIG. 4B is a side diagram of one side thereof.

Referring to FIGS. 4A and 4B, a radiating element 30' that may be applied to various embodiments of the present disclosure has the same principle as that shown in FIGS. 3A to 3C and a structure similar thereto. That is, the radiating element 30' shown in FIGS. 4A and 4B is implemented as a structure of coupling a dipole type first radiator 33 for generating +45 degrees polarization of dual polarization with a dipole type second radiator 34 for generating −45 degrees polarization of the dual polarization. The first radiator 33 is composed of a first radiating arm 33-1 and a second radiating arm 33-2, and the second radiator 34 is also composed of a first radiating arm 34-1 and a second radiating arm 34-2. Further, the first radiator 33 is configured to be fed through the first feed line 41, and the second radiator 34 is configured to be fed through the second feed line 42. Further, the first radiator and the second radiator 34 are implemented to be spaced apart from each other to be formed on different planes, and a beam forming direction of the first radiator 33 and a beam forming direction of the second radiator 34 are implemented to become directions opposite to each other.

However, unlike the structure shown in FIGS. 3A to 3C, in the radiating element 30' shown in FIGS. 4A and 4B, the entire shape of each of the first radiator 33 and the second radiator is not a straight line shape, but each of the first radiator 33 and the second radiator 34 has a predetermined angle with the one direction, is prepared in the form of extending along each of the first surface and the second surface, and has a curvature changed in the extending direction. Here, the first surface and the second surface may be connected to form a curved surface that is the side surface of a cylinder, and the first radiator 33 and the second radiator 34 are positioned to face each other. Specifically, referring to FIGS. 4A and 4B, the first radiator 33 and the second radiator 34 may be formed in a curved shape in which the center is convex compared to the edge portion thereof. It may be seen that this structure has the first and second radiators 33, 34 formed along the curved surface that is the side surface of the cylinder indicated by the dotted line in FIGS. 4A and 4B. It may be seen that this form is a structure of further reducing the sizes of the radiating element 30' and the omni-directional antenna according to the above than the structure shown in FIGS. 3A to 3C.

Although the first and second radiators 33, 34 shown in FIGS. 4A and 4B may also be configured by molding a thin metal plate (e.g., copper plate), like the structure shown in FIGS. 3A to 3C, it may be efficient to implement them with a circuit pattern through a pattern printing method by using an F-PCB. When implemented by using the F-PCB, the radiating patterns of the first and second radiators 33, 34 are formed to be spaced at appropriate intervals apart from each other on one F-PCB. Then, the corresponding F-PCB may be implemented to be connected in the form of roundly molding to have the arrangement structure of the first and second radiators 33, 34 as shown in FIGS. 4A and 4B.

Figure 5A:
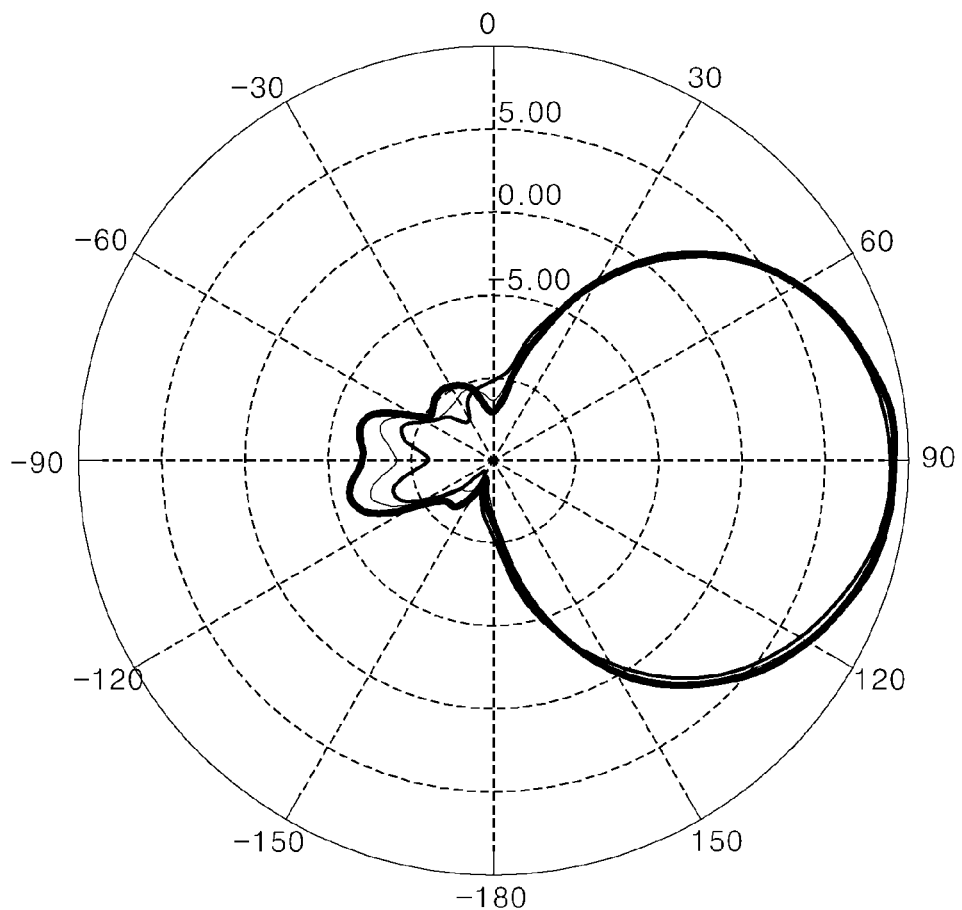
FIGS. 5A and 5B are graphs for explaining the radiating characteristics of the radiating element shown in FIGS. 4A and 4B.
Figure 5B:
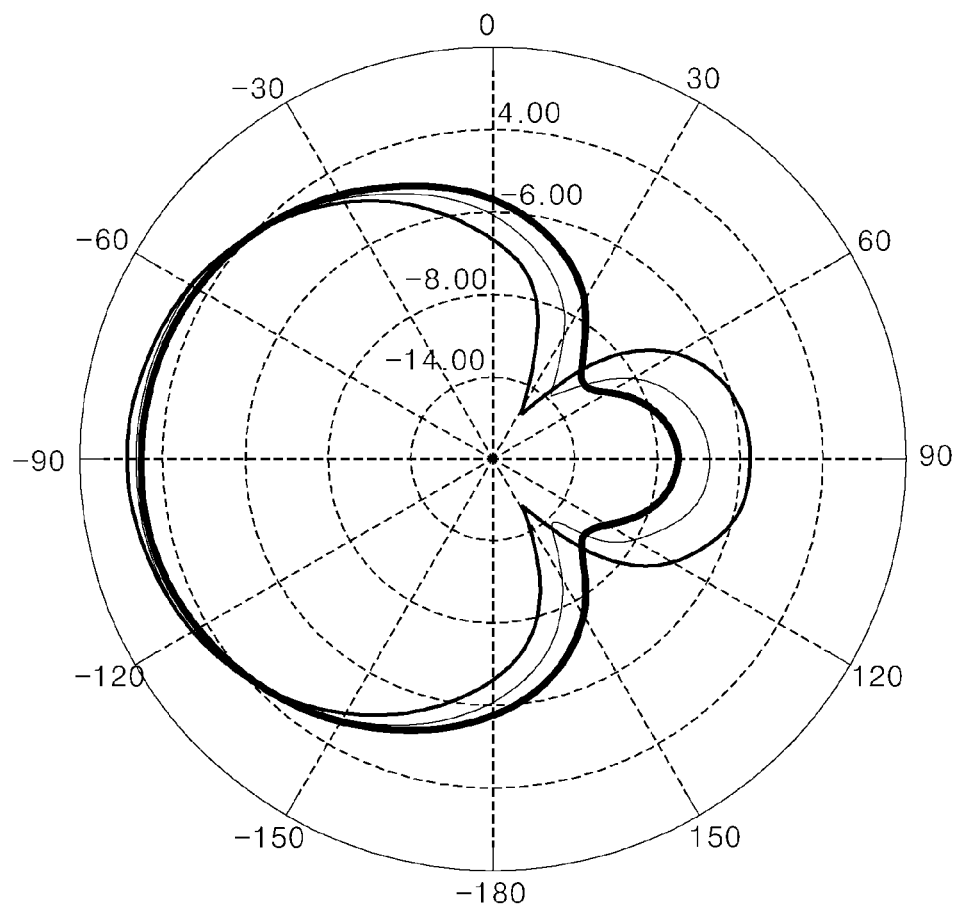

FIGS. 5A and 5B are graphs for explaining the radiating characteristics of the radiating element shown in FIGS. 4A and 4B. FIG. 5A shows the radiating characteristics of the conventional one radiating element of a portion corresponding to a first surface of three surfaces of the omni-directional antenna shown in FIG. 1A, etc., for example, for comparison with the present disclosure. FIG. 5B shows the radiating characteristics of the first radiator 33, for example, of the radiating element 30' shown in FIGS. 4A and 4B. The radiating characteristics of the second radiator 34 of the radiating element 30' shown in FIGS. 4A and 4B are the same as the characteristics shown in FIG. 5B, but it will be understood that the radiating beam direction is formed at 180 degrees in the opposite direction.

Referring to FIGS. 5A and 5B, it may be seen that the conventional radiating element positioned on the first surface of the three surfaces has the beam width of about 61.8 to 63.1 degrees, while the radiating element according to the embodiments of the present disclosure has the beam width of one radiating arm of about 93.5 to 112 degrees. As described above, it may be seen that the radiating element according to the embodiments of the present disclosure may have the beam width wider at about 30 degrees or more than the conventional one, thereby having good omni-directional characteristics. This is because a perfect spherical pattern having good ripple characteristics may be produced as it has a wider beam width. Particularly, although it was difficult to form a wide beam width in the single element, it may be seen that the radiating element according to the embodiments of the present disclosure may achieve it.

Figure 6:
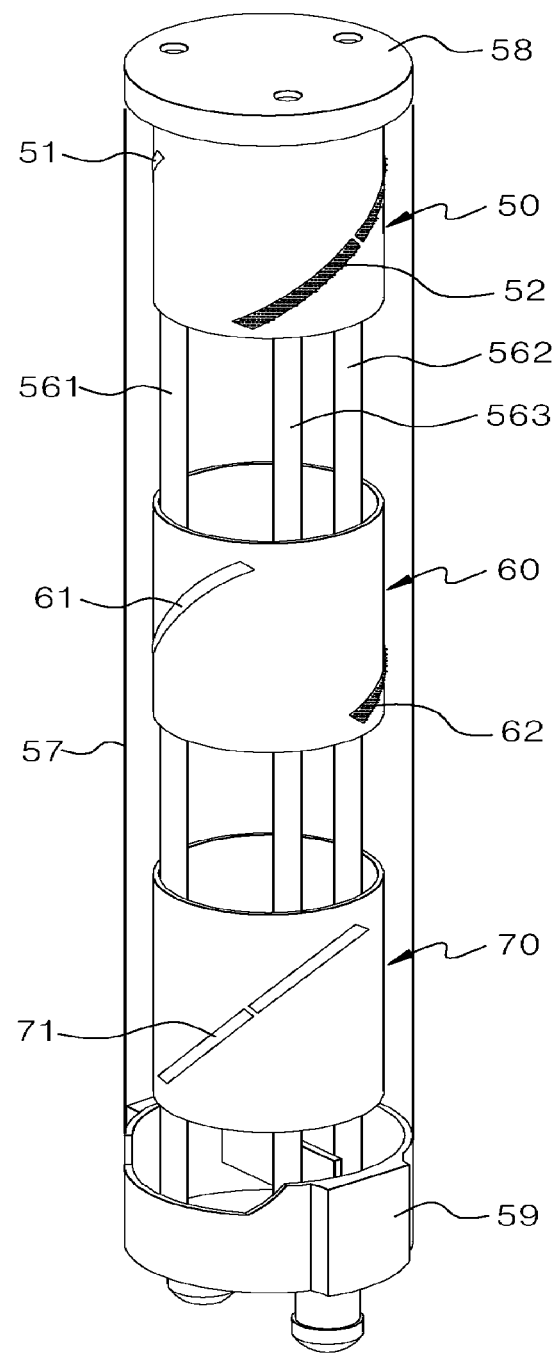
FIG. 6 is a diagram showing a structure of an omni-directional antenna for generating dual polarization according to a first embodiment of the present disclosure.
Figure 7:
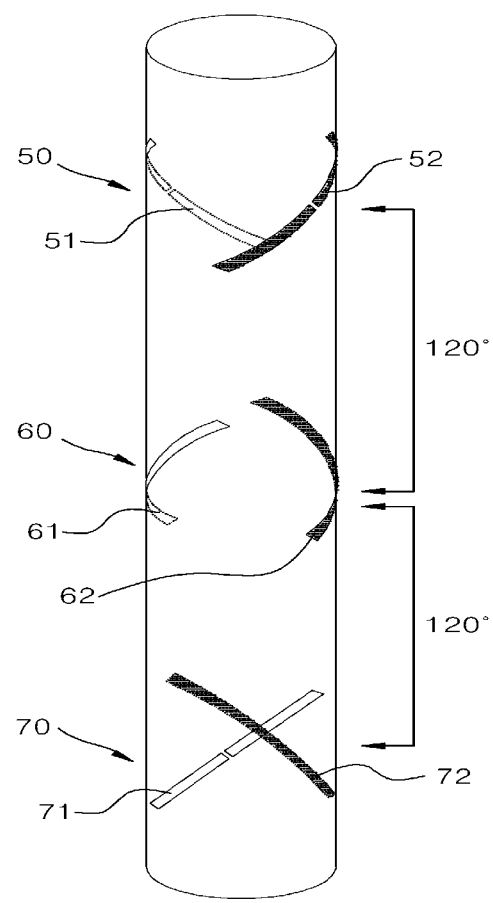
FIG. 7 is a diagram schematically showing the combination characteristics between the radiating elements of FIG. 6.

FIG. 6 is a diagram showing a structure of an omni-directional antenna for generating dual polarization according to a first embodiment of the present disclosure, and FIG. 7 is a diagram schematically showing the combination characteristics between the radiating elements of FIG. 6. Referring to FIGS. 5 and 6, the omni-directional antenna according to a first embodiment of the present disclosure has a structure in which the radiating element, to which the structure according to the feature of the present disclosure as shown in FIGS. 3A to 4B has been applied, has been combined in plural. In the example of FIGS. 6 and 7, for example, it is shown that the first, second, and third radiating elements 50, 60, 70 having a structure according to the radiating element shown in FIGS. 4A and 4B have been configured to be continuously arranged in a vertical direction. Each of the first to third radiating elements 50, 60, 70 may be composed of first radiators 51, 61, 71 and second radiators 52, 62, 72, and configured by using an F-PCB, respectively.

At this time, the first, second, and third radiating elements 50, 60, 70 are configured to be positioned in a state having rotated 120 degrees mutually with respect to a vertical axis thereof. For example, if a position of the first radiator 51 of the first radiating element 50 facing on the horizontal plane is 0 degrees when viewed in plane, the first radiator 61 of the second radiating element 60 is installed to face 120 degrees, and the first radiator 71 of the third radiating element 70 is installed to face 240 degrees. According to this structure, the installation angles of the first to third radiating elements 50, 60, 70 are installed to have the same intervals as each other when viewed in plane, and the first to third radiating elements 50, 60, 70 are combined to each other to entirely generate +/−45 degrees polarization in the omni direction.

Meanwhile, as shown in FIG. 6, the omni-directional antenna according to the first embodiment of the present disclosure may have an upper cap 58 and a lower cap 59 as a case for forming the entire appearance of the omni-directional antenna, similar to a general antenna structure, and further, have a radome 57 for surrounding the radiating elements between the upper cap 58 and the lower cap 59. Further, the omni-directional antenna according to the first embodiment of the present disclosure may include, for example, a support made of a material (plastic, Teflon, etc.) not affecting the propagation characteristics, for example, first, second, and third supports 561, 562, 563 in order to support the radiating elements. Further, it may further include a feed structure (not shown) for feeding the respective radiating elements and signal processing equipments (not shown) for processing a transmission and reception signal.

Figure 8:
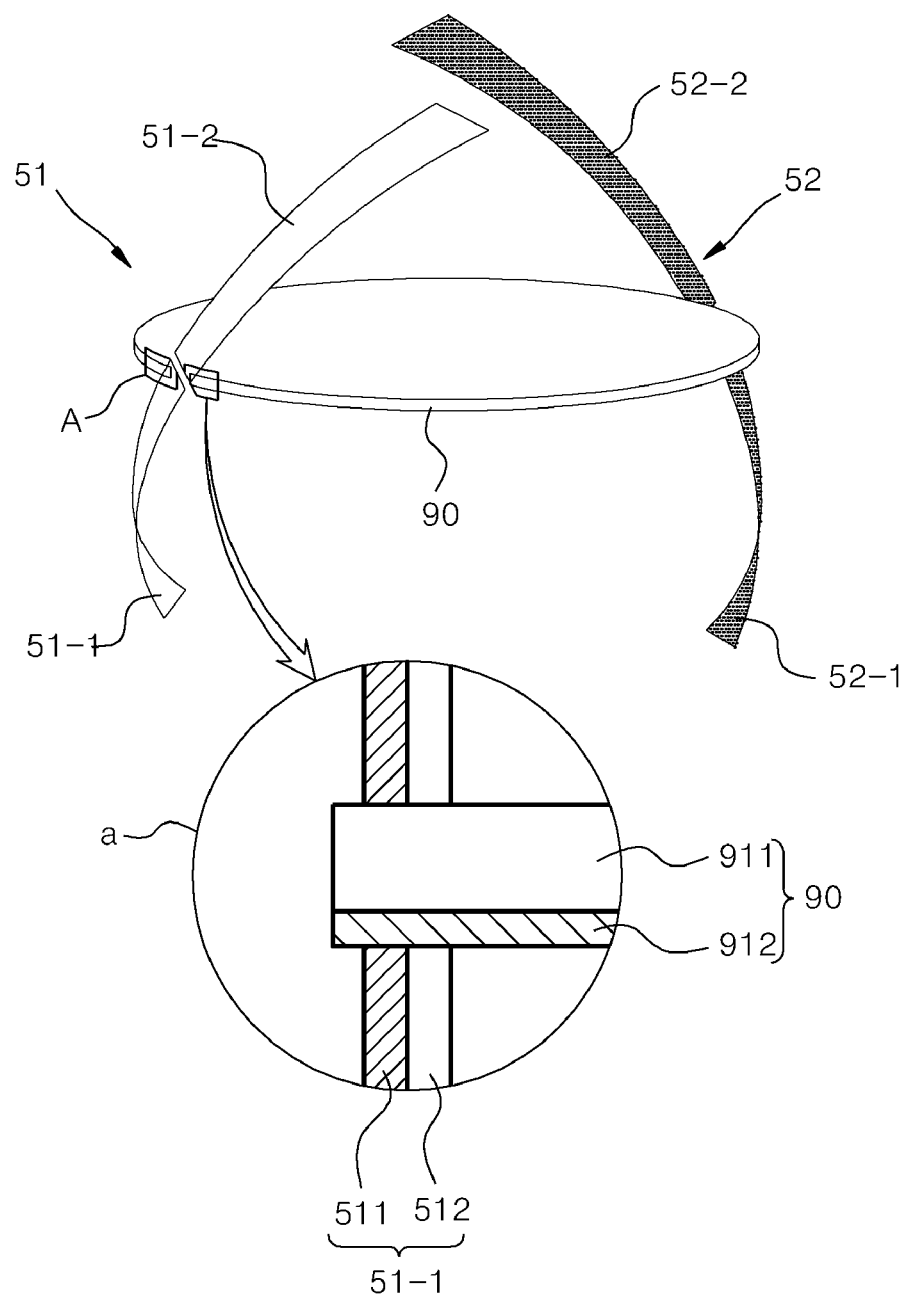
FIG. 8 is a detailed perspective diagram of one radiating element of FIG. 6.
Figure 9A:
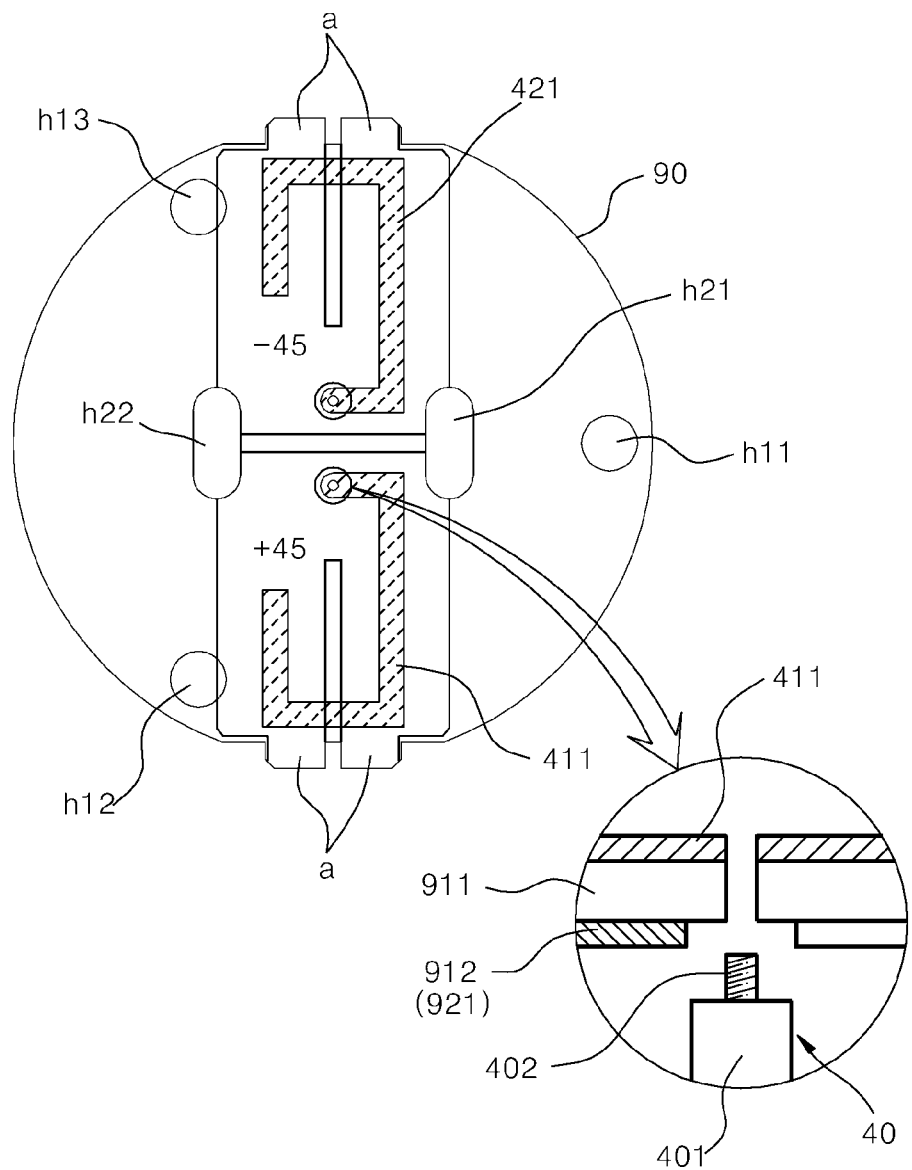
FIGS. 9A and 9B are diagrams showing structures of a feed plate applied to one radiating element of FIG. 6.
Figure 9B:
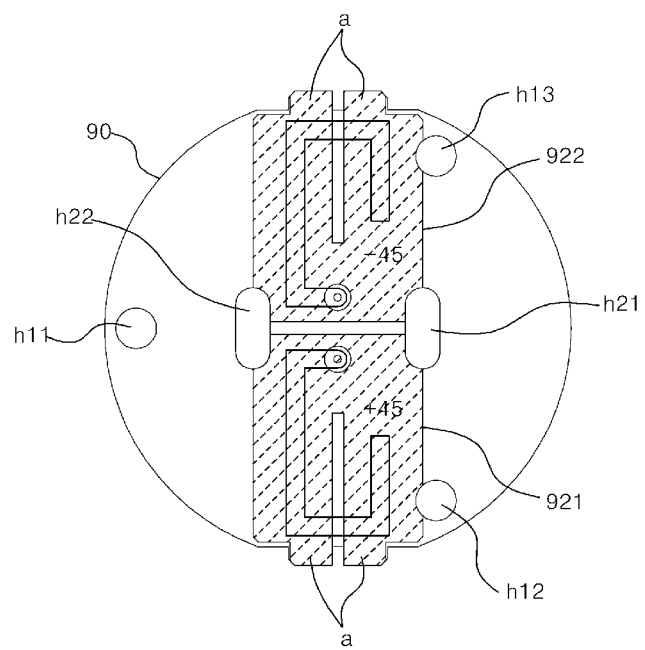

FIG. 8 is a detailed perspective diagram of one radiating element (e.g., the first radiating element 50) of FIG. 6, and FIGS. 9A and 9B are diagrams showing structures of the upper surface and the lower surface of a feed plate applied to one radiating element (e.g., the first radiating element 50) of FIG. 6, respectively. In FIG. 8, for convenience of explanation, a configuration corresponding to the F-PCB has been mostly omitted, and an F-PCB layer 512 is shown in an enlarged portion regarding a portion A in FIG. 8.

Referring to FIG. 8, for example, the first and second radiating arms 51-1, 51-2, 52-1, 52-2 of each of the first and second radiators 51, 52 of the first radiating element 50 may be continuously formed on the F-PCB. Then, the corresponding F-PCB may be molded roundly in a cylinder shape, and may be installed in the form in which both side surfaces contacting each other are attached and fixed to each other. Each of the radiators 51, 52 of the radiating element 50 formed on the F-PCB may have a structure that is fed through a feed plate 90 of the PCB structure in which a feed pattern is formed, respectively. At this time, the feed plate 90 may be formed in a circular shape having a diameter corresponding to the F-PCB (i.e., a diameter corresponding to the corresponding radiating element), and the F-PCB may be installed by molding roundly in the form of surrounding the circular feed plate.

At this time, in the F-PCB, the first radiating arms 51-1, 52-1 and the second radiating arms 51-2, 52-2 may be formed with a through hole (portion A) in a portion adjacent to a feed point for each of the first and second radiating arms 51, 52, respectively. Further, the feed plate 90 may be formed with a protrusion (a in FIG. 9) at the corresponding size at a position corresponding to a position where these through holes are formed, respectively. When being installed by molding roundly in the form of surrounding the feed plate 90 through this structure, the F-PCB may be installed in the form that the protrusion (a) of the feed plate 90 is fitted into the through holes.

The form that the protrusion (a) of the feed plate 90 has been fitted through the through hole of the F-PCB layer 512 is shown in more detail in a circle region indicated by a dashed line in FIG. 8. The feed plate 90 has a ground layer 912 (extended to the protrusion (a)) formed on the lower surface of a support layer 911 made of a material such as epoxy, and a radiating pattern 511 of the first radiating arm 51-1 of the first radiator 51 and the ground layer 912 of the feed plate 90 are electrically connected by soldering, etc., for example, in a state where the protrusion (a) has been fitted into the through hole of the F-PCB layer 512.

Referring to FIGS. 9A and 9B, describing a structure of the feed plate 90 in more detail, the feed plate 90 includes the support layer 911 made of an epoxy material, etc., first and second feed patterns 411, 421 formed on the upper surface of the support layer 911, and the ground layer 912 formed on the lower surface of the support layer 911. The ground layer 912 is composed of first and second ground patterns 921, 922.

For example, one end of the first feed pattern 411 has a structure for feeding the first radiator 51 in a coupling method, and the other end of the first feed pattern 411 is formed in pattern as a structure of receiving the feed signal (e.g., −45 degrees) from the feed point formed on the feed plate 90. The feed point is configured to receive the feed signal through the feed line (e.g., 40) that may be formed of a coaxial cable. The connection structure of the feed plate 90 and the feed line 40 is shown in more detail in the circle region indicated by a dashed line in FIG. 9A. Referring to this, an inner conductor 402 of the feed line 40 formed of the coaxial cable is inserted through the through hole formed at the feed point to penetrate the feed plate 90, and connected with the feed pattern 411 of the upper surface of the feed plate 90. An outer conductor 401 of the feed line 40 is connected with the first ground layer 921 of the ground layer 912 of the lower surface of the feed plate 90.

The feed plate 90 having such a configuration may have a plurality of supports (e.g., 561, 562, 563 in FIG. 6) penetrated therein, and have a plurality of through holes h11, h12, h13 supported by the plurality of supports. Further, a plurality of connection passages h21, h22 through which the feed line(s) 40 passes may be formed in the form of a through hole at appropriate positions.

Figure 10A:
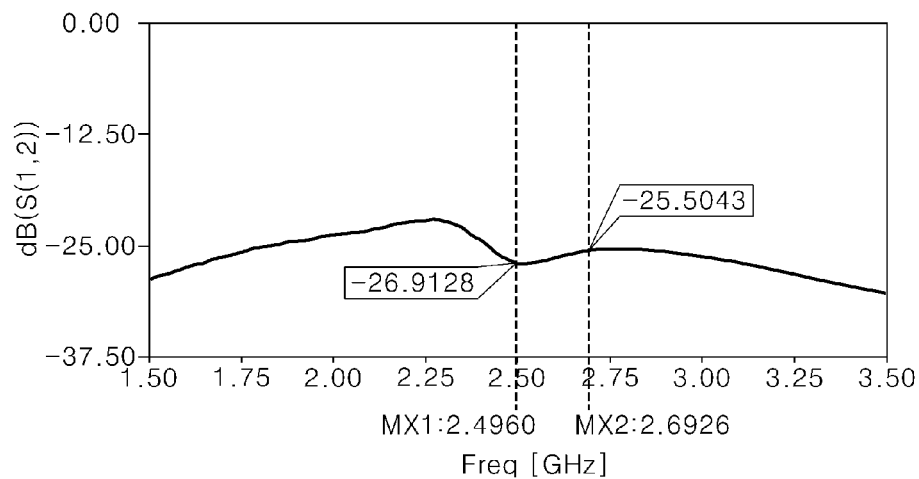
FIGS. 10A and 10B are graphs showing the isolation characteristics relevant to the omni-directional antenna of FIG. 6.
Figure 10B:
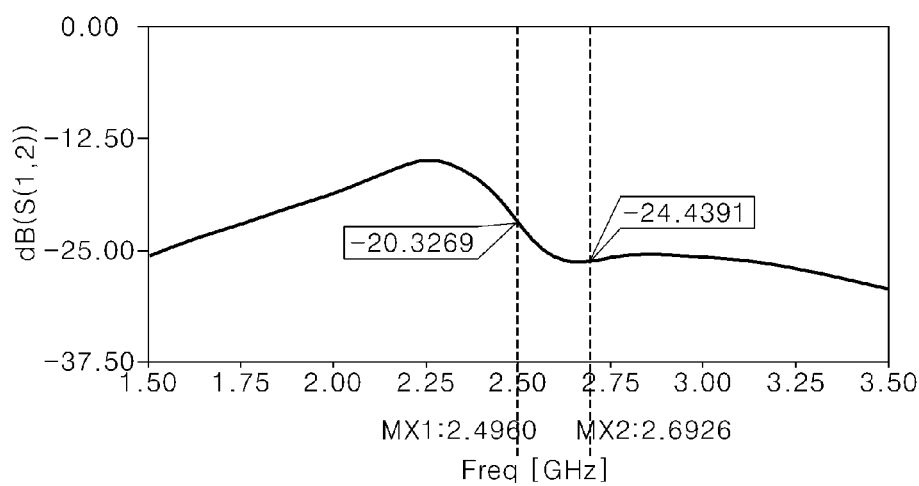

FIGS. 10A and 10B are graphs showing isolation characteristics relevant to the omni-directional antenna of FIG. 6. FIG. 10A shows, for example, the isolation characteristics between the +45 degrees polarization and the −45 degrees polarization if the radiating element for a 2.5 GHz band (specifically, 2496 to 2690 MHz) has been designed to have 40 mm in diameter, and FIG. 10B shows the isolation characteristics if the radiating element has been designed to have 35 mm in diameter in the same condition.

Referring to FIGS. 10A and 10B, although the conventional radiating element for having the same characteristics has been designed to have 100 mm or more, for example, in diameter, it may be seen that the diameter of the radiating element of the omni-directional antenna according to the embodiments of the present disclosure is reduced by 60% or more compared with the conventional one. Particularly, when implementing a small-sized cell MIMO antenna, the diameter of the radiating element may be reduced by 65% or more compared to the conventional one as shown in FIG. 10B if an isolation 20 dB reference is satisfied.

Figure 11A:
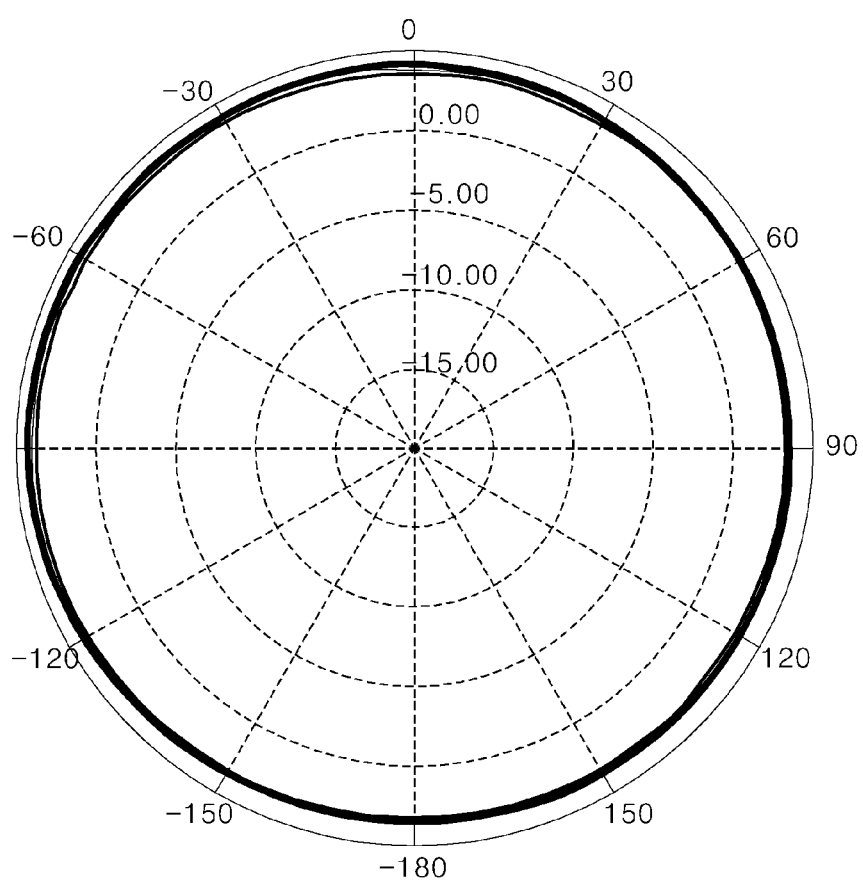
FIGS. 11A and 11B are graphs showing the radiating characteristics relevant to the omni-directional antenna of FIG. 6.
Figure 11B:
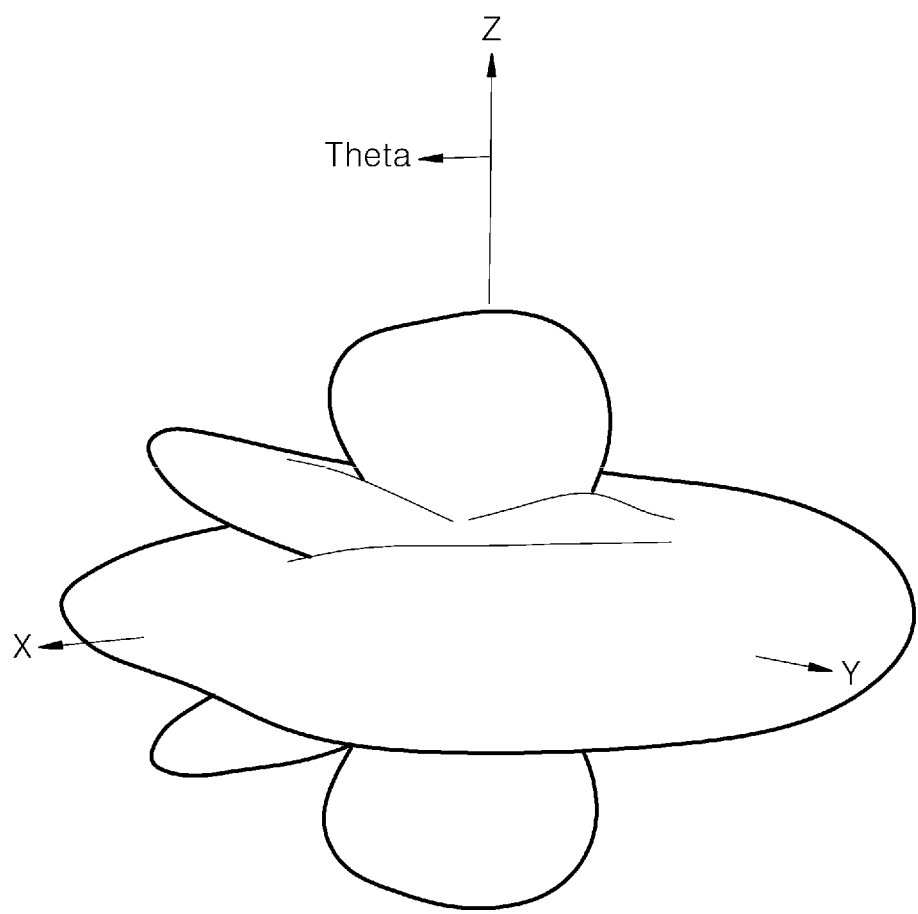

FIGS. 11A and 11B are graphs showing the radiating characteristics relevant to the omni-directional antenna of FIG. 6, and FIG. 11A shows the radiating characteristics in the horizontal direction, and FIG. 11B shows the radiating characteristics of the omni-directional antenna in the three dimensions. As shown in FIGS. 11A and 11B, it may be seen that the omni-directional antenna according to an embodiment of the present disclosure is formed to have the good omni-directional radiating characteristics. Particularly, as shown in FIG. 11A, the radiating pattern with very good ripple characteristics in the horizontal direction in the omni-direction radiating pattern is shown, and as shown in FIG. 11B, it may be seen that the omni-directional antenna according to an embodiment of the present disclosure satisfies very good omni-direction radiating characteristics.

Figure 12:
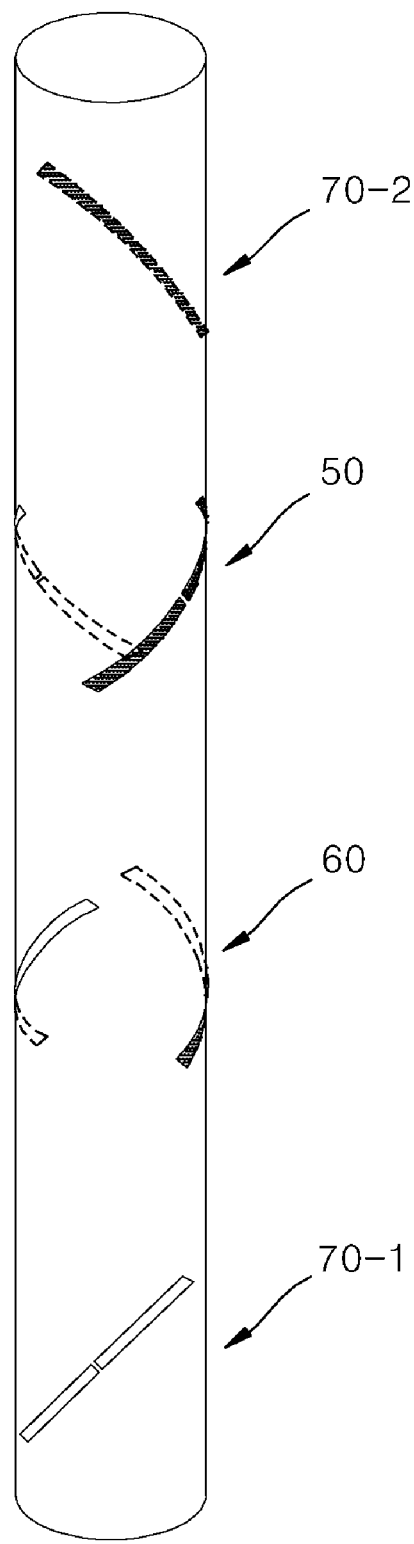
FIG. 12 is a diagram showing a structure of an omni-directional antenna for generating dual polarization according to a second embodiment of the present disclosure.

FIG. 12 is a diagram showing a structure of an omni-directional antenna for generating dual polarization according to a second embodiment of the present disclosure, and schematically shows only a main pattern of each radiating arm of each radiating element for convenience of explanation. The first radiating element 50 and the second radiating element 60 shown in FIG. 12 may have the same structure as those shown in FIG. 6, etc. However, in the structure shown in FIG. 12, a first half radiating element 70-1 substantially composed only of the first radiator, and a second half radiating element 70-2 substantially composed only of the second radiator are configured separately, which are provided at the lower end and the upper end of the entire antenna structure, respectively.

Specifically, the first half radiating element 70-1 composed only of the first radiator generates one polarization of dual polarization, the second half radiating element 70-2 composed only of the second radiator generates the other polarization of the dual polarization, and the first half radiating element 70-1 and the second half radiating element 70-2 are positioned at both end portion sides in one direction of the plurality of radiating elements 50, 60, respectively. It may be seen as if this structure divides the third radiating element 70 shown in FIG. 6 into half to be installed at the lower end and the upper end of the entire antenna structure, respectively.

At this time, each of the plurality of radiating elements 50, 60 and the first half radiating element 70-1 may be spaced apart at the same angle while being spaced apart in one direction. For example, it may be seen that referring to FIG. 12, the angles in the directions in which the first radiating element 50, the second radiating element 60, and the first half radiating element 70-1 are installed are installed to be spaced at the same angles by 120 degrees apart from each other, respectively. Likewise, the angles in the directions in which the first radiating element 50, the second radiating element 60, and the second half radiating element 70-2 are installed are installed to be spaced at the same angles by 120 degrees apart from each other, respectively. Although the structure shown in FIG. 12 increases in the entire length compared to the structure shown in FIG. 6, it is possible to further improve the isolation between the +45 degrees polarization and the −45 degrees polarization.

Figure 13:
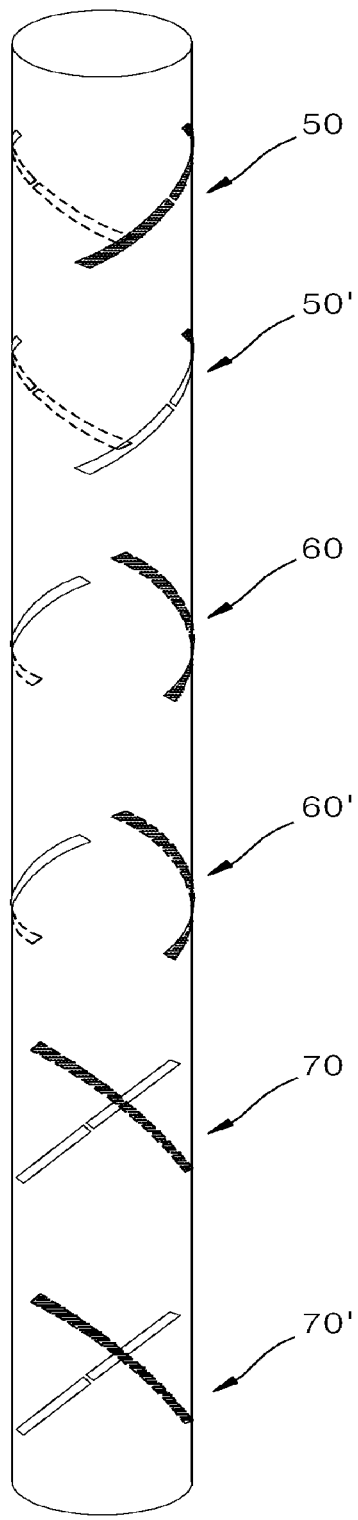
FIG. 13 is a diagram showing a structure of an omni-directional antenna for generating dual polarization according to a third embodiment of the present disclosure.

FIG. 13 is a diagram showing a structure of an omni-directional antenna for generating dual polarization according to a third embodiment of the present disclosure, and schematically shows only a main pattern of each radiating arm of each radiating element for convenience of explanation. A structure of each of the first radiating element 50, the second radiating element 60, and the third radiating element 70 shown in FIG. 13 may have the same structure as those shown in FIG. 6, etc. However, in the structure shown in FIG. 13, it is shown that the first, second, third radiating elements 50, 60, 70 are implemented in dual, respectively. Although this structure increases in the entire length compared to the structure shown in FIG. 6, it may be more advantageous for improving the isolation and radiating characteristics between polarizations.

As described above, the configuration and operation of the dual polarized omni-directional antenna according to the embodiments of the present disclosure may be made, and meanwhile, although specific embodiments have been described in the above description of the present disclosure, various modifications may be embodied without departing the scope of the present disclosure.

For example, although some embodiments have been configured differently with respect to the number of radiating elements constituting the omni-directional antenna, etc. in the description of the embodiments, it will be understood that other embodiments of the present disclosure may implement the omni-directional antenna as the radiating elements having various numbers and structures in addition to the above. For example, if the size is not largely restricted in the design of the antenna, it is also possible to form the omni-directional antenna by combining more radiating elements, and further, in some cases, it is also possible to combine only two radiating elements. Further, it is also possible to selectively apply the half radiating element shown in FIG. 13 in various embodiments.

Further, although the first, second, and third radiating elements 50, 60, 70 have been installed to face the directions of 0 degrees, 120 degrees, and 240 degrees, respectively, on the horizontal plane when viewed in plane in the above description, for example, in FIG. 6, etc., it is sufficiently possible in other embodiments of the present disclosure that for example, four radiating elements are also installed to face the directions of 0 degrees, 90 degrees, 180 degrees, and 270 degrees, respectively, on the horizontal plane when viewed in plain, considering the radiating characteristics of the radiating element, etc.

Further, although it has been described in the above description that each of the radiating arms constituting the radiating element is, for example, a straight-shaped bar structure, for example, the radiating arms may have a polygonal or circular ring shape such as a square shape or a rhombus shape, or may also be variously implemented in a rectangular plate shape or a ribbon shape, etc., in addition to the above, in various other embodiments of the present disclosure.

Further, at least some detailed configurations in each of the various embodiments in the above description may also be applied to other embodiments, and in some cases, may also be omitted. As describe above, there may be various modifications or changes of the present disclosure, and accordingly, the scope of the present disclosure is not defined by the above-described embodiment but should be defined by the claims and the equivalents to the claims.

INDUSTRIAL APPLICABILITY

According to the present disclosure, it is possible to manufacture a dual polarized omni-directional antenna and a base station including the same, which may generate +/−45 degrees dual polarization while having the good omni-direction radiating characteristics, and have a small-sized and lightweight structure.

What is claimed is:

1. An antenna, comprising:
a radiating element comprising a first radiator and a second radiator, wherein the first radiator comprises a first radiating arm and a second radiating arm, the second radiator comprises a third radiating arm and a fourth radiating arm, the first radiating arm extends in a first direction on a first plane and the second radiating arm extends in a second direction on the first plane, the second direction being an opposite direction to the first direction, the third radiating arm extends in a third direction on a second plane and the fourth radiating arm extends in a fourth direction on the second plane, the fourth direction being an opposite direction to the third direction, the second plane is spaced apart from and parallel with the first plane, and the first direction is perpendicular to the third direction;
a first feed line configured to transmit a first feed signal to the first radiating arm and the second radiating arm;
a second feed line configured to transmit a second feed signal to the third radiating arm and the fourth radiating arm; and
a feed plate comprising a first feed pattern and a second feed pattern formed on its upper surface and a ground pattern on its lower surface, wherein the first feed pattern is configured to provide the first feed signal to the first radiating arm and the second radiating arm, and the second feed pattern is configured to provide the second feed signal to the third radiating arm and the fourth radiating arm,
wherein the first feed line comprises an inner conductor and an outer conductor,
wherein the first feed line penetrates the feed plate so that the inner conductor of the first feed line is in contact with the first feed pattern and the outer conductor of the first feed line is in contact with the ground pattern.

2. The antenna of claim 1, wherein the first radiator is configured to generate one polarization of dual polarization, and the second radiator is configured to generate the remaining polarization of the dual polarization.

3. The antenna of claim 1, wherein a main lobe direction of the first radiator and a main lobe direction of the second radiator are different directions from each other.

4. The antenna of claim 1, wherein the antenna is a dual polarized omni-directional antenna.

5. The antenna of claim 1, wherein the first radiator and the second radiator are a dipole type.

6. The antenna of claim 1, wherein the first radiator and the second radiator intersect each other in an X shape.

7. The antenna of claim 1, wherein the feed plate further comprises:
a support layer having an upper surface and a lower surface,
wherein the first feed pattern and the second pattern are is formed on the upper surface of the support layer.

8. The antenna of claim 1, wherein the second feed line comprises an inner conductor and an outer conductor, and
wherein the first feed line penetrates the feed plate so that the inner conductor of the second feed line is in contact with the second feed pattern and the outer conductor of the second feed line is in contact with the ground pattern.

9. An antenna comprising:
a radiating element comprising a first radiator and a second radiator, wherein the first radiator comprises a first radiating arm and a second radiating arm, the second radiator comprises a third radiating arm and a fourth radiating arm, the first radiating arm extends in a first direction along a first curved surface and the second radiating arm extends in a second direction along the first curved surface, the third radiating arm extends in a third direction along a second curved surface and the fourth radiating arm extends in a fourth direction along the second curved surface, and the first direction is perpendicular to the third direction;
a first feed line configured to transmit a first feed signal to the first radiating arm and the second radiating arm; and
a second feed line configured to transmit a second feed signal to the third radiating arm and the fourth radiating arm.

10. The antenna of claim 9, wherein the first radiator is configured to generate one polarization of dual polarization, and the second radiator is configured to generate the remaining polarization of the dual polarization.

11. The antenna of claim 9, wherein a main lobe direction of the first radiator and a main lobe direction of the second radiator are different directions from each other.

12. The antenna of claim 9, wherein the first radiator and the second radiator are a dipole type.

13. The antenna of claim 9, further comprising:
a feed plate on which a feed pattern is formed so as to transmit the first feed signal to the first radiator and the second radiator.

14. The antenna of claim 13, wherein the feed plate comprises:
a support layer having an upper surface and a lower surface,
wherein the feed pattern is formed on the upper surface of the support layer.

15. The antenna of claim 14, wherein the feed plate further comprises:

a ground layer formed on the lower surface of the support layer, and wherein a ground pattern is formed on the ground layer.

16. The antenna of claim 15, wherein the first feed line comprises an inner conductor and an outer conductor.

17. The antenna of claim 16, wherein the inner conductor of the first feed line penetrates the feed plate to be electrically connected to the feed pattern, and the outer conductor of the first feed line is electrically connected with the ground pattern.

18. The antenna of claim 9, wherein the first curved surface and the second curved surface are side surfaces of a cylinder.

19. The antenna of claim 9, wherein the second direction is opposite to the first direction.

* * * * *